United States Patent Office 3,428,618
Patented Feb. 18, 1969

3,428,618
PROCESS FOR POLYMERIZING FLUOROOLEFINS WITH A CYCLIC AZO AMIDINE FREE RADICAL INITIATOR
Jack E. Cook, New Brighton, Minn., and Oren L. Marrs, Bartlesville, Okla., assignors to Phillips Petroleum Company, a corporation of Delaware
No Drawing. Filed May 10, 1965, Ser. No. 454,717
U.S. Cl. 260—92.1    10 Claims
Int. Cl. C08f 3/22

ABSTRACT OF THE DISCLOSURE

Fluoroolefin monomers are polymerized using a cyclic amidine initiator of the formula

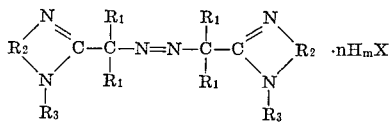

This invention relates to the preparation of polymeric materials. In one aspect, this invention relates to a process for polymerizing fluoroolefins. In another aspect, this invention relates to a process for producing copolymers and terpolymers of two or more fluoroolefin monomers.

Fluoroolefin polymers including poly(vinyl fluoride), poly(vinylidene fluoride), and poly(tetrafluoroethylene) have been accepted commercially to provide coatings on materials such as cloth, paper, wood, and metal. Poly(tetrafluoroethylene) is especially suited as a coating material for surfaces which are likely to be exposed to corrosive chemicals because of the extremely high chemical resistance which it possesses. Poly(vinyl fluoride) is particularly suited for coating the exterior surfaces of buildings and the like because it is almost completely immune to the effects of weather under all climatic conditions. In addition to serving as coatings, the fluoroolefin polymers can be molded or extruded into a variety of different shapes including sheets, ribbons, rods, and conduits. Suitable plasticizers, stabilizers, softeners, dyes, pigments, fillers, etc., can be added to the polymer to provide the properties desired in the final product.

In view of the widespread commercial market which has evolved in recent years for fluoroolefin polymers, a variety of different processes have been discovered for their production. Although the improvements between the several processes for preparing polyfluoroolefins may have appeared insignificant at the time of discovery, when applied on a commercial scale they have resulted in a polymer of superior quality. In some instances, the discoveries have resulted in a more efficient process thereby reducing the overall cost of forming the polymer. The improvements made in the catalyst or free radical initiators used for effecting the polymerization have contributed significantly to the improved processes and the better product.

Although initiators such as benzoyl peroxide and other peroxides can be used for initiating the polymerization of fluoroolefin monomers, the produced polymer is lacking in thermal stability and weatherability. Another initiator of the prior art for polymerizing fluoroolefins is an organic azo compound having an acyclic azo group bonded to aliphatic carbon atoms of a particular character. Although the organic azo compounds have been widely used, the produced polymers are still lacking in weatherability and thermal stability. A more recent advancement in the art of initiators for effecting the polymerization of fluoroolefin monomers is an azo compound having amidine or guanyl groups in the form of their acid salts. The hydrogen atoms of the amide nitrogen of the guanyl radicals can be replaced by monovalent acyclic organic radicals. Although this type of azo compound is moderately successful for initiating polymerization of fluoroolefins, the resulting polymer has a high melt-flow number. Since the melt-flow number is an indication of molecular weight, and since the molecular weight decreases as the melt-flow number increases, the polymers formed by means of the azo initiators are not completely acceptable because of their relatively low molecular weights. Another disadvantage inherent with the acyclic azo amidine initiator is that the formed polymer is dispersed in a uniform manner throughout the diluent. This undesirable feature makes initial separation of the polymer from the diluent difficult and also causes difficulties in subsequent filtration or other separation techniques. Still another disadvantage associated with the fluoroolefin polymer produced with the azo type initiator is that they are brittle as evidenced by a relatively low percent elongation. This is an undesirable feature because it greatly limits the utility of the polymer.

According to this invention, these and other disadvantages of the prior art processes for polymerizing fluoroolefins are overcome by contacting a fluoroolefin monomer with a cyclic amidine free radical initiator of the formula:

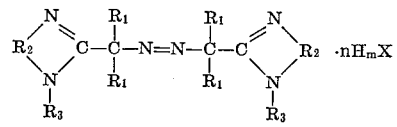

wherein each $R_1$ is selected from the group consisting of alkyl, aryl, cycloalkyl, and carboxyalkyl radicals and combinations thereof, such as aralkyl and alkaryl, containing from 1 to 8 carbon atoms, inclusive; wherein each $R_2$ is selected from the group consisting of alkylene, cycloalkylene, aralkylene, o-arylene, and o-alkarylene radicals containing from 1 to 10 carbon atoms, inclusive; wherein each $R_3$ is selected from the group consisting of hydrogen and alkyl, aryl, cycloalkyl and radicals and combinations thereof, such as aralkyl and alkaryl, containing from 1 to 8 carbon atoms, inclusive; wherein $n$ is a whole integer of from 0 to 2, inclusive; wherein X is an anion of an acid; and wherein $m$ is an integer equal to the valence of the anion.

Specific compounds within the above structural formula which can be employed as polymerization initiators in the practice of this invention are:

azobis-N,N'-methyleneisobutyramidine monoacetate
azobis-N,N'-dimethyleneisobutyramidine
azobis-N,N'-dimethyleneisobutyramidine dihydrochloride
2,2'-azobis-[N-p-tolyl-N,N'-tetramethylene-2-ethyl-2-(4-methylcyclohexyl)]acetamidine
2,2'-azobis-N-cyclooctyl-N,N'-decamethylene-2-n-octylcapramidine sulfate
2,2'-azobis-N-(2-phenethyl)-N,N'-(2-phenyltrimethylene)-2,2-diphenylacetamidine
2,2'-azo - (N-ethyl-N,N'-o-phenylene-2,2-di-n-propylacetamidine) - (N-[2-ethylphenyl]-N,N'-o-naphthylene-2,2-dicyclohexylacetamidine) dihydrochloride
2,2'-azobis-N,N'-(2-cyclohexyltetramethylene)-2,2-di(4-ethylcyclohexyl)acetamidine
2,2'-azobis-N,N'-(4-n-butyl-o-phenylene)-2,2-dibenzylacetamidine
2,2'-azobis-N,N'-(dimethylene)-2-methyl-2-phenylacetamidine
2,2'-azobis-N,N'-(dimethylene)-2-methyl-2-carboxymethylacetamidine
2,2'-azobis-N-methyl-N,N'-trimethylene-2,2-dimethylacetamidine diproprionate and the like.

The cyclic amidine initiators of this invention can be employed as the free base or the acid salt for promoting the polymerization of fluoroolefins. The use of the initiators of this invention results in a process which is more efficient than the processes of the prior art and a product which has superior properties to the polymers prepared by using the initiators of the prior art. Fluoroolefin monomers which can be polymerized to form homopolymers, copolymers, and terpolymers include vinyl fluoride, vinylidene fluoride, 1,2-difluoroethylene, tetrafluoroethylene, hexafluoropropylene, 1-fluoro-2-chloroethylene, and 1,1,2-trifluoro-2-chloroethylene. It is to be understood that both the cis and trans forms of the above materials which exhibit cis and trans isomerism can be utilized.

Accordingly, it is an object of this invention to provide an improved process for polymerizing fluoroolefins.

Another object of this invention is to provide a free radical initiator for polymerizing fluoroolefins.

A further object of this invention is to provide a process for producing fluoroolefin polymer having superior qualities.

Still another object of this invention is to provide a process for producing fluoroolefin polymers having a high molecular weight, high tensile strength, and high elongation.

These and other objects of the invention will become apparent to one skilled in the art after studying the following detailed description and the appended claims.

In this practice of this invention, the fluoroolefin monomers can be polymerized by contacting them with a cyclic amidine initiator of the class described. This can be accomplished by charging a polymerization reactor with a diluent having the free radical initiator dispersed therein. It is necessary for the diluent to be inert to the cyclic amidine initiator to prevent any interaction between them. Suitable diluents which can be used for this purpose include water, low molecular weight alcohols such as methanol and ethanol, and hydrocarbons such as n-hexane, isooctane, cyclohexane, and the like. It is generally preferred to use water as the diluent because it is inexpensive and freely available. The amount of cyclic amidine initiator required to effect polymerization of the fluoroolefin monomers is generally within the range of from about 10 parts per million to about 1000 parts per million based on the amount of diluent. The preferred range of initiator is from about 50 parts per million to about 150 parts per million based on the diluent. It is preferred to use a diluent to monomer weight ratio within the range of from about 1:1 to about 15:1.

The cyclic amidine initiators of this invention can be prepared, for example, by treatment of non-cyclic amidines with diamines. The non-cyclic amidines are in turn prepared by treatment of azobisnitrile compounds with alcohol and acid followed by treatment with ammonia. The preparation of the azobisnitriles by reaction of ketones with alkali metal cyanides and hydrazine is well known in the art.

To illustrate the synthesis of these initiators the cyclic amidine free radical initiator used in the following examples can be prepared by reacting α,α′-azodiisobutyronitrile first with ethanol and HCl, followed by reaction with NH$_3$ to form azobisisobutyramidine dihydrochloride. The azobisisobutyramidine salt can then be reacted with ethylenediamine to form azobis-N,N-dimethyleneisobutyramidine. If the corresponding acid salt is desired, the free base cyclic amidine can be treated with an acid such as hydrochloric acid, sulfuric acid, phosphoric acid, acetic acid, propionic acid, and the like. The acid salt can be formed by treating the cyclic amidine initiator with a suitable acid before the initiator is charged to the polymerization reactor or the free base cyclic amidine can be added to the polymerization reactor as such and a desired amount of the chosen acid can be added to the reactor to cause the salt to be formed in situ. The fluoroolefin monomers to be polymerized are then pressured into the reactor.

The polymerization process is conducted at a temperature sufficiently high to cause decomposition of the cyclic amidine initiator and attendant formation of free radicals. The reaction temperature is generally within the range of from about 25° to about 250° C., with the preferred range being from about 50° to about 150° C. The pressure at which the polymerization is effected will depend upon the particular fluoroolefin chosen. As a general rule, the pressure should not be less than about atmospheric and preferably at least about 500 p.s.i. since it is necessary to cause dissolution of at least a portion of the fluoroolefin monomers into the diluent whereby they are contacted with free radicals generated from the cyclic amidine initiator. Although the polymerization can be effected at pressures as high as 15,000 p.s.i. or more, it is generally preferred not to exceed this value for obvious economic reasons. In the polymerization of vinyl fluoride, it is desirable to operate at a pressure of at least 500 p.s.i. and preferably above 3000 p.s.i. Reaction times can vary from a few minutes to several days. Generally, depending primarily upon the operating pressure and temperature, a reaction time of from about 1 to about 10 hours is employed.

A typical method which can be employed for polymerizing a fluoroolefin in accordance with this invention involves charging a diluent such as water having the desired amount of cyclic amidine initiator into a polymerization reactor. A fluoroolefin such as vinyl fluoride in the vapor phase is then charged to the reactor until the reactor reaches a pressure of about 1000 p.s.i. The temperature of the reactor is then increased to about 100° C. whereupon the pressure in the reactor will have increased to about 5000 p.s.i. The reaction is then allowed to continue for several hours during which time the reaction mixture will be a liquid phase consisting primarily of diluent, dissolved vinyl fluoride, dispersed polymer, and a vapor phase consisting of vinyl fluoride. After polymerization, any suitable means can be employed for recovering the polymer. For example, the reactor effluent including diluent and polymer can be filtered and the polymer can be washed with any suitable material such as water or acetone.

The following example will serve to illustrate a method which was used for preparing the cyclic amidine initiator of this invention. It must be understood that this example is for the purpose of illustration only.

Example I

α,α′-azodiisobutyronitrile was reacted with ethanol and hydrochloric acid to form an intermediate which was treated with dry ammonia to form azobisisobutyramidine dihydrochloride. Five grams of azobisisobutyramidine dihydrochloride was then reacted with 50 milliliters of ethylenediamine. The azobisisobutyramidine dihydrochloride dissolved in the ethylenediamine, and after a few minutes stirring at 25° C. a white precipitate of the free base of azobis - N,N′ - dimethyleneisobutyramidine was formed. The azobis-N,N′-dimethyleneisobutyramidine precipitate was filtered off and dried. An elemental analysis of the prepared azobis-N,N′-dimethyleneisobutyramidine showed that the material contained 51.4 weight percent carbon and 10.3 weight percent hydrogen. The infrared spectrum of this material was consistent with that for a cyclic amidine. Approximately one-third of the dried precipitate was separated and removed to storage and the remaining two-thirds was dissolved in about 50 to 75 milliliters of warm chloroform after which dry hydrogen chloride gas was bubbled through the solution for about one-half hour. The treatment with the dry HCl gas resulted in the formation of a precipitate identified as the dihydrochloride of azobis-N,N′-dimethyleneisobutyramidine. This precipitate was then filtered from the solution, washed with chloroform, and dried under vacuum.

Example II

A series of polymerization runs was conducted in which vinyl fluoride was contacted with the free base and acid salt initiators prepared by Example I. The particular initiator and the amount used in each of the several runs is reported in Table I below. Table I also reflects the polymer yield from each of the runs and the physical properties of the polymers produced.

In each of these polymerization runs, the initiator was charged to a 1.1 liter reactor along with 700 milliliters of water. As indicated in Table I, the amount of initiator was varied for each of the runs to illustrate the operability of the different initiators. Vinyl fluoride was then pressured into the reactor at a temperature of about 30° C. until a pressure of 1100 p.s.i. was obtained. The reactor was then heated to a temperature of about 97° C. and agitated by means of a rocker for the desired length of time. At the termination of the polymerization run, the reactor was opened after it had cooled. In the runs using a cyclic amidine free base, 2,2'-azobis(N,N'-dimethylene)isobutyramidine, as the initiator, it was observed that the polymer had stratified into a layer on the surface of the water diluent. In the runs using the acyclic amidine, 2,2'-azobis(isobutyramidine)dihydrochloride, as the initiator, it was observed that the polymer was dispersed throughout the diluent. A slurry including water and polyvinyl fluoride was then removed from the reactor and the polymer separated by filtration. The polyvinyl fluoride was difficult to separate from the diluent when the prior art initiator was employed. When 2,2'-azobis (N,N'-dimethylene)isobutyramidine was used, the polymer was easily separated from the diluent. The polymer recovered was then washed with water and acetone and dried.

The melt-flow number, which is an indication of molecular weight, was determined for the polymers produced. The melt-flow number can be defined as the square of the average diameter in inches of a film formed from a one-inch diameter disc of one gram of polymer by compressing the one-inch disc between two platens for a period of five minutes at a temperature of 500° F. using a load pressure of 13,000 pounds. After cooling the platens the film was removed and its diameter measured. The square of the diameter of each film in inches is reported in Table I as the melt-flow number. It is apparent that the melt-flow numbers for each of the polymers produced by using the free base cyclic amidine initiators of this invention are much lower than the melt-flow numbers of the polymers produced with the initiators of the prior art. Since the melt-flow number is inversely proportional to the molecular weight, the polymers of this invention have a much higher molecular weight than the polymers produced by the processes of the prior art.

A mixture of polymer and gramma-butyrolactone for each of the polymers produced was compression molded in a 8" x 8" press using 20,000 pounds ram pressure with a 4" ram at a temperature of 400° F. for two minutes to produce a polymer film. The amount of gamma-butyrolactone used was calculated by the formula described in detail in Example III. The percent elongation and tensile strength for each of the films thus produced was determined by pulling the polymer film on a commercial Instron machine using a ½-inch wide specimen approximately 4 mils thick, a jaw to jaw separation of one inch, and a crosshead speed of 1"/minute. The tensile strength and percent elongation for each of the polymers produced is reported in Table I. It is apparent that the polymers produced by using the cyclic amidine initiators of this invention have a percent elongation which is much higher than the percent elongation of the polymers produced in accordance with the initiators of the prior art. This indicates that a much less brittle polymer was produced by means of the initiator of this invention thus greatly expanding the utility of the product.

TABLE I

| Initiator | Pressure, p.s.i.g. | Temperature (° C.) | Time (hrs.) | Amount of Initiator (grams) | Polymer Yield (grams) | Melt-Flow Number | Tensile Strength [1] (p.s.i.) | Elongation (percent) |
|---|---|---|---|---|---|---|---|---|
| Run No.: | | | | | | | | |
| 1 ... 2,2'-azobis(isobutyramidine) dihydrochloride. | 5,000 | 97 | 4 | 0.2 | 80 | 11.2 | 6,360 | 17 |
| 2 ... do | 5,000 | 97 | 3 | 0.1 | 83 | 11.2 | 5,717 | 49 |
| 3 ... do | 5,000 | 97 | 4 | 0.05 | 27.6 | 8.7 | 6,420 | 80 |
| 4 ... do | 5,000 | 97 | 7 | 0.05 | 55.5 | 9.8 | 6,050 | 92 |
| 5 ... do | 5,000 | 97 | 7 | 0.025 | 43 | 9.9 | | |
| 6 ... do | 6,500 | 97 | 3 | 0.0062 | 32.5 | 7.6 | 5,927 | 202 |
| 7 ... 2,2'-azobis(N,N'-dimethylene-isobutyramidine)·2HCl. | 5,000 | 97 | 4.5 | 0.2 | 58.3 | 10.7 | 5,893 | 18 |
| 8 ... do | 6,500 | 97 | 6 | 0.1 | 29 | 12.5 | 6,023 | 8 |
| 9 ... do | 6,500 | 97 | 6 | 0.05 | 26 | 10.9 | 5,855 | 27 |
| 10 ... do | 6,500 | 97 | 16 | 0.05 | 30 | 10.2 | 5,305 | 21 |
| 11 ... do | 6,500 | 97 | 6 | 0.025 | 22 | 8.7 | 5,304 | 21 |
| 12 ... do | 6,500 | 97 | 6 | 0.025 | 17 | 8.7 | 5,214 | 18 |
| 13 ... 2,2'-azobis(N,N'-dimethylene-isobutyramidine). | 5,000 | 97 | 4.5 | 0.2 | 71.2 | 7.2 | 5,582 | 105 |
| 14 ... do | 5,000 | 97 | 4.5 | 0.2 | 44.9 | 7.2 | 5,920 | 109 |
| 15 ... do | 5,000 | 97 | 4.5 | 0.1 | 40 | 7.2 | 5,445 | 210 |
| 16 ... do | 6,500 | 97 | 6 | 0.05 | 45 | 6.4 | 5,437 | 251 |
| 17 ... do | 6,500 | 97 | 6 | 0.05 | 51 | 6.2 | 5,470 | 209 |
| 18 ... do | 6,500 | 97 | 6 | 0.05 | 35 | 7.2 | 6,000 | 116 |
| 19 ... do | 6,500 | 97 | 6 | 0.025 | 59 | 3.7 | 5,660 | 381 |

[1] Yield.

By comparing the data in Table I, it can be seen that the cyclic amidine initiators of this invention result in a polymer of superior quality to the polymers produced in accordance with the processes employing the initiators of the prior art. The cyclic amidine free base initiator results in the production of a polymer which is particularly superior to the polymers produced by the prior art processes in that the polymer has a much greater percent elongation. This improved property in the polymer greatly expands its utility because the higher the percent elongation, the tougher the polymer. Since the melt-flow numbers for the polymers produced with the cyclic amidine free base initiators are less than the melt-flow numbers of the polymers produced by the initiator of the prior art, the resulting polymers have a greater toughness and higher resistance to weathering thus expanding their utility in the field of molded products. Moreover, the fluoroolefin polymers formed by using the initiators of this invention are more easily separated from the diluent than are the polymers produced by using the initiators of the prior art.

The polymers formed by the initiators of this invention are more economical to process than the polymers formed with the initiators of the prior art in the sense that less extrusion aid is required to produce a slurry which can be processed such as by extrusion or compression molding techniques. Example III below serves to illustrate the improved and unexpected results in this respect.

Example III

Poly(vinyl fluoride) was prepared in two separate runs, one run utilizing an initiator of the prior art, 2,2′-azobis-(isobutyramidine)dihydrochloride, and the other run utilizing an initiator of this invention, 2,2′-azobis(N,N′-dimethyleneisobutyramidine). In each of these runs, the amount of initiator used was chosen to produce polymers having essentially the same melt-flow number.

In the run made with 2,2′-azobis(isobutyramidine)dihydrochloride initiator, the reactor and procedure of Example II was utilized. The run was made using 0.0062 gram of initiator. This run was carried out at a pressure of 6500 p.s.i. for three hours at 97° C. The yield of poly(vinyl fluoride) was 32.5 grams, and this material had a melt-flow number of 7.6.

In the run utilizing 2,2′-azobis(N,N′-dimethyleneisobutyramidine), the apparatus and procedure of Example II was used. The run was carried out using 0.2 gram of initiator at 5000 p.s.i. and 97° C. for 4.5 hours. The yield of poly(vinyl fluoride) was 71.2 grams, and the polymer had a melt-flow number of 7.2.

In accordance with techniques well known in the art, each of these polymers was mixed with gamma-butyrolactone processing aid. The amount of gamma-butyrolactone used was calculated from the formula $P=(26.5)(1.06)^F$ wherein P is the percentage of processing aid in the gamma-butyrolactone-polymer mixture and F is the melt-flow number of the specific polymer being mixed with the processing aid. The mixture of polymer and gamma-butyrolactone made from the polymer obtained using the initiator of the prior art formed a very thick slurry whose viscosity could not be determined with a Gardner bubble viscometer. The mixture of polymer and gamma-butyrolactone made from the polymer prepared by the initiator of this invention was a very fluid slurry having an absolute viscosity of 2.65 poises as measured on the Gardner bubble viscometer. The result is surprising and completely unexpected in view of the fact that both mixtures were prepared with the amount of gamma-butyrolactone determined by the same equation. Actually, the mixture obtained with the polymer prepared with the initiator of this invention had too low a viscosity for proper processing. The amount of gamma-butyrolactone in the mixture with the polymer formed by the initiator of this invention was then reduced to obtain a thicker slurry which could be processed. As will be seen from the data in the following table, the polymers made with the initiators of this invention can be processed using much less processing aid than is required for polymers made with the initiators of the prior art.

TABLE II

| Polymer | Poly(vinyl fluoride) | Poly(vinyl fluoride) | |
|---|---|---|---|
| Initiator | 2,2′-azobis(isobutyramidine) dihydrochloride initiator | 2,2′-azobis(N,N′-dimethyleneisobutyramidine) | |
| Melt-Flow Number | 7.6 | 7.2 | |
| Solvent/Polymer ratio based on the Melt-flow number | 17/12 | 17/12 | |
| Solvent/Polymer ratio necessary for more processability | | 14/12 | |
| Absolute viscosity immediately after mixing at room temperature (poises) | (¹) | 2.65 | |
| Absolute viscosity immediately after mixing at room temperature for the 14/12 solvent-polymer ratio (poises) | | 148 | |
| Absolute viscosity 1.5 hrs. after mixing at room temperature (poises) | | 3.7 | |
| Absolute viscosity 1.5 hrs. after mixing at room temperature for the 14/12 solvent-polymer ratio (poises) | | 148 | |

¹ Too thick to measure: This mixture was more viscous than the mixture prepared from the polymer made by the initiator of this invention and mixed in a 14/12 solvent-polymer ratio and measured 1.5 hrs. after mixing (i.e., more viscous than 148 as determined by the Gardner bubble viscometer).

The polymers prepared by the initiator of this invention are particularly advantageous when used as protective coatings for the exterior surfaces of buildings and the like because of their high resistance to the effects of weather. Such an increase in the weatherability of the polymers greatly expands their utility.

Although the invention has been described in considerable detail, it must be understood that such description is for that purpose only and that many variations and modifications can be made by one skilled in the art without departing from the spirit and scope of the invention.

We claim:

1. In a process for the polymerization of fluoroolefin monomers, the improvement comprising contacting a polymerizable fluoroolefin monomer having 2 or 3 carbon atoms per molecule with a free radical initiator, at a temperature sufficient to cause decomposition of said initiator, of the formula

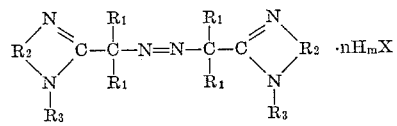

wherein each $R_1$ is selected from the group consisting of alkyl, aryl, cycloalkyl, and carboxyalkyl radicals and combinations thereof containing from 1 to 8 carbon atoms, inclusive; wherein each $R_2$ is selected from the group consisting of alkylene, cycloalkylene, aralkylene, o-arylene, and o-alkarylene radicals containing from 1 to 10 carbon atoms, inclusive; wherein each $R_3$ is selected from the group consisting of hydrogen and alkyl, aryl, cycloalkyl radicals and combinations thereof containing from 1 to 8 carbon atoms, inclusive; wherein $n$ is a whole integer of from 0 to 2, inclusive; wherein X is an anion of an acid; and wherein $m$ is an integer equal to the valence of the anion.

2. In a process for the polymerization of fluoroolefin monomers in a diluent at a temperature within the range of from about 25° to about 250° C. and at a pressure sufficient to cause dissolution of the monomers in the diluent, the improvement comprising contacting a polymerizable fluoroolefin monomer having 2 or 3 carbon atoms per molecule with a free radical initiator of the formula

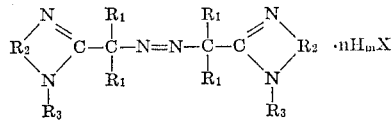

wherein each $R_1$ is selected from the group consisting of alkyl, aryl, cycloalkyl, and carboxyalkyl radicals and combinations thereof containing from 1 to 8 carbon atoms, inclusive; wherein each $R_2$ is selected from the group consisting of alkylene, cycloalkylene, aralkylene, o-arylene, and o-alkarylene radicals containing from 1 to 10 carbon atoms, inclusive; wherein each $R_3$ is selected from the group consisting of hydrogen and alkyl, aryl, cycloalkyl radicals and combinations thereof containing from 1 to 8 carbon atoms, inclusive; wherein $n$ is a whole integer of from 0 to 2, inclusive; wherein X is an anion of an acid; and wherein $m$ is an integer equal to the valence of the anion.

3. A process according to claim 2 wherein said initiator is present in said diluent in an amount of from about 10 to about 1000 p.p.m. of said diluent.

4. In a process for the polymerization of a fluoroolefin selected from the group consisting of vinyl fluoride, vinylidene fluoride, tetrafluoroethylene, hexafluoropropylene, 1-fluoro-2-chloroethylene, and 1,1,2-trifluoro-2-chloroethylene, the improvement comprising contacting the fluoroolefin monomers with a free radical initiator, at a temperature sufficient to cause decomposition of said initiator, of the formula

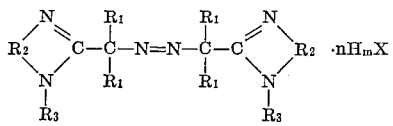

wherein each $R_1$ is selected from the group consisting of alkyl, aryl, cycloalkyl, and carboxyalkyl radicals and combinations thereof containing from 1 to 8 carbon atoms, inclusive; wherein each $R_2$ is selected from the group consisting of alkylene, cycloalkylene, aralkylene, o-arylene, and o-alkarylene radicals containing from 1 to 10 carbon atoms, inclusive; wherein each $R_3$ is selected from the group consisting of hydrogen and alkyl, aryl, cycloalkyl radicals and combinations thereof containing from 1 to 8 carbon atoms, inclusive; wherein $n$ is a whole integer of from 0 to 2, inclusive; wherein X is an anion of an acid; and wherein $m$ is an integer equal to the valence of the anion.

5. In a process for the polymerization of vinyl fluoride in a diluent at a pressure of at least 100 p.s.i., the improvement comprising contacting the vinyl fluoride monomers with a free radical initiator, at a temperature sufficient to cause decomposition of said initiator, of the formula

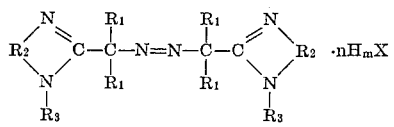

wherein each $R_1$ is selected from the group consisting of alkyl, aryl, cycloalkyl, and carboxyalkyl radicals and combinations thereof containing from 1 to 8 carbon atoms, inclusive; wherein each $R_2$ is selected from the group consisting of alkylene, cycloalkylene, aralkylene, o-arylene, and o-alkarylene radicals containing from 1 to 10 carbon atoms, inclusive; wherein each $R_3$ is selected from the group consisting of hydrogen and alkyl, aryl, cycloalkyl radicals and combinations thereof containing from 1 to 8 carbon atoms, inclusive; wherein $n$ is a whole integer of from 0 to 2, inclusive; wherein X is an anion of an acid; and wherein $m$ is an integer equal to the valence of the anion.

6. In a process for polymerizing vinyl fluoride in a diluent of water at a temperature within the range of from about 25° to about 250° C. and at a pressure of at least 500 p.s.i., the improvement comprising contacting the vinyl fluoride monomers with a free radical initiator of the formula

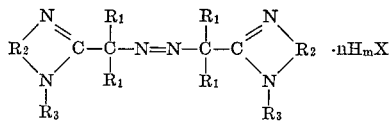

wherein each $R_1$ is selected from the group consisting of alkyl, aryl, cycloalkyl, and carboxyalkyl radicals and combinations thereof containing from 1 to 8 carbon atoms, inclusive; wherein each $R_2$ is selected from the group consisting of alkylene, cycloalkylene, aralkylene, o-arylene, and o-alkarylene radicals containing from 1 to 10 carbon atoms, inclusive; wherein each $R_3$ is selected from the group consisting of hydrogen and alkyl, aryl, cycloalkyl radicals and combinations thereof containing from 1 to 8 carbon atoms, inclusive; wherein $n$ is a whole integer of from 0 to 2, inclusive; wherein X is an anion of an acid; and wherein $m$ is an integer equal to the valence of the anion.

7. A process according to claim 6 wherein said initiator is present in said diluent in an amount of from about 10 to about 1000 p.p.m. of said diluent.

8. The process of claim 4 wherein $n$ is 0.

9. The process of claim 8 wherein said initiator is 2,2'-azobis(N,N'-dimethylene)isobutyramidine.

10. The process of claim 9 wherein said fluoroolefin is a vinyl fluoride.

References Cited

UNITED STATES PATENTS

| | | | |
|---|---|---|---|
| 2,599,300 | 6/1952 | Upson | 260—92.1 |
| 3,129,207 | 4/1964 | James | 260—92.1 |
| 3,265,678 | 8/1966 | Hecht | 260—92.1 |

JOSEPH L. SCHOFER, *Primary Examiner.*

JOHN A. DONAHUE, JR., *Assistant Examiner.*

U.S. Cl. X.R.

260—87.5, 87.7, 92.1